United States Patent
Walter et al.

(10) Patent No.: US 6,361,443 B1
(45) Date of Patent: Mar. 26, 2002

(54) SHAFT COUPLING

(75) Inventors: Jurgen Walter, Haltern; Ulrich Falz, Dortmund, both of (DE)

(73) Assignee: Hackforth GmbH & Co., Herne (DE)

( * ) Notice: Subject to any disclaimer, the term of this patent is extended or adjusted under 35 U.S.C. 154(b) by 0 days.

(21) Appl. No.: 09/402,514

(22) PCT Filed: Apr. 8, 1998

(86) PCT No.: PCT/EP98/02046

§ 371 Date: Dec. 10, 1999

§ 102(e) Date: Dec. 10, 1999

(87) PCT Pub. No.: WO98/45610

PCT Pub. Date: Oct. 15, 1998

(30) Foreign Application Priority Data

Apr. 8, 1997 (DE) .......................................... 197 14 420

(51) Int. Cl.⁷ .................... F16D 003/78; F16D 003/76; F16D 3/64
(52) U.S. Cl. .............................. 464/92; 464/87; 464/88; 464/93
(58) Field of Search ............................ 464/92, 87, 88, 464/93

(56) References Cited

U.S. PATENT DOCUMENTS

| | | | | |
|---|---|---|---|---|
| 2,532,755 A | * | 12/1950 | Bloomfield | .................. 464/96 |
| 4,763,767 A | * | 8/1988 | Lanzarini et al. | .......... 464/92 X |
| 4,929,115 A | * | 5/1990 | Lunke et al. | .............. 464/96 X |
| 4,968,286 A | * | 11/1990 | McGuire | .................. 464/92 X |
| 5,564,981 A | * | 10/1996 | Iwabuchi et al. | ......... 464/92 X |

FOREIGN PATENT DOCUMENTS

| | | |
|---|---|---|
| DE | 29 18 619 | 11/1980 |
| EP | 0 710 544 | 5/1996 |
| FR | 980 352 | 5/1951 |
| GB | 576 691 | 5/1946 |
| GB | 693 844 | 7/1953 |
| GB | 720 404 | 12/1954 |
| GB | 1 021 419 | 3/1966 |

OTHER PUBLICATIONS

Flexible shaft coupling for motor vehicles–has heat reflective layer to protect elastic coupling against ambient heat, May 9, 1979, Derwet abstracts, Translation.*

* cited by examiner

*Primary Examiner*—Lynne H. Browne
*Assistant Examiner*—Ernesto Garcia
(74) *Attorney, Agent, or Firm*—Collard & Roe, P.C.

(57) ABSTRACT

The invention relates to a shaft coupling (1) comprising at least one elastomer transmission element (2). In order to meet continuously increasing requirements in terms of dynamic load capacity and long service life, and with a view to providing special protection against oxidation-caused aging in hostile environments such as high temperatures, the outer surface of the transmission element (2) is provided at least partially with an anti-aging, airtight covering (3).

5 Claims, 1 Drawing Sheet

SHAFT COUPLING

BACKGROUND OF THE INVENTION

1. Field of the Invention

The invention relates to a shaft coupling with at least one elastomer transmission element.

2. The Prior Art

With the type of elastic shaft couplings specified above, the torque is transmitted via elastic transmission elements which are designed in the form of single- or multi-component rotary thrust or torsion elements depending on which version is employed. The very exacting requirements which the elastic material has to satisfy with respect to linear extension behavior and high stability over long periods of time are met in the prior art since a long time through the use of vulcanized natural rubber, so-called DIENE rubber.

Caused by the dynamic load due to changes in load during operation, lost heat is generated in the elastic rubber body, which has to be dissipated in order to avoid local overheating. This requires cooling of the transmission elements which, under the operating conditions found in driving trains heretofore, is safely ensured through cooling of the ambient air flowing by. The cooling effect and thus the safety reserve have been raised further through measures such as the introduction of additional cooling windows.

However, the trend in the further development of drive trains, for example in connection with drives for marine vessels, where such elastic shaft couplings are preferably employed, is taking a direction in which the continually increasing requirements with respect to dynamic load capacity result in more unfavorable ambient conditions for the operation of the coupling because of increasing power densities as well as longer maintenance intervals occurring at the same time, as heat-emitting machinery such as diesel engines, turbochargers and the like are installed within the immediate proximity of the coupling. This leads to increased ambient temperatures that make an effective dissipation of heat more difficult.

The more adverse operating conditions, therefore, require further development of the elastic transmission elementsbecause particularly in connection with elastomers with suitable mechanical properties, oxidative ageing on the surface of the material increases over-proportionately as temperatures rise, the reason being that the ambient air not only effects cooling, but the oxygen component contained in such air leads to atmospheric attack on the elastomer material in the form of ozone or oxygen ageing on the outwardly exposed surfaces. The oxygen diffusing into the surfaces in particular is the cause of embrittlement of the surface, which favors the formation of cracks under high loads.

Attempts have been made to integrate chemical protection against ageing by adding suitable protective substances to the elastomer material. However, the proportionate amount of such addives may not be too high, on the one hand, as that would impair the mechanical properties, and it is a basic phenomenon, on the other hand, that protection against ageing consumes itself in the course of time.

SUMMARY OF THE INVENTION

Therefore in light of said problems the invention is based on the problem of providing a further developed shaft coupling with a transmission element which is stable under adverse ambient conditions such as elevated ambient temperatures also over the long term, and protected at the same time particularly against oxidative ageing processes.

For solving said problem, the invention proposes that the transmission element is provided on its surface at least partially with an anti-ageing covering which is impermeable to air.

The design as defined by the invention is equally applicable to single- and multi-component rotational thrust or torsion elements made of DIENE rubber or other materials. In this connection, preferably at least the zones of the surface which are directly in contact with the ambient air are provided with the coating as defined by the invention.

The coating as defined by the invention is characterized in that it is resistant to the greatest possible extent to the environmental influences described above, such as, for example, oxygen-caused ageing. In order to satisfy said requirements, a material is usefully applied which is heatproof, or thermally stable and resistant to oxygen-caused ageing at the same time. Depending on the given conditions under which it is used, and the loads to be expected, the covering can be designed in the form of a coating flatly adhering to the transmission element, or in the form of a sheet-like covering.

The special advantage of the invention directly results from the fact that the covering screens and thus protects the endangered surface of the transmission element against atmospheric influences. Oxygen-caused ageing is practically completely prevented in this way, and the useful life is prolonged even under hostile environmental conditions. At the same time, the capability of giving off heat is not influenced in any critical way due to the low thickness of the material of the covering and the selection of suitable materials which are permeable to heat.

It is conceivable to provide the entire transmission element with a coating or covering. As a rule, however, it will be sufficient if the transmission element is provided with a covering as defined by the invention only on its outer, exposed circumferential surface, because the outer jacket surfaces are subjected to the relatively highest mechanical and thermal stresses and, as opposed to the vulcanized contact areas between the flanges and the transmission element, are directly in contact with the ambient air, so that oxidative ageing predominantly occurs on said surfaces.

According to one embodiment of the invention, provision is made that the covering is provided in the form of a protective film applied to the surfaces in the liquid state, or such film is vulcanized or glued to the transmission element, flatly adhering to the latter. Such a protective film has to be highly elastic for it to be capable of absorbing the occurring deformations without problems.

According to a particularly advantageous further development of the invention, the coating is provided in the form of a covering, in which case it is wrapped around the surface in a protective way, if need be with pre-tensioning, resting on the surface but without being flatly fixed on the latter. The special advantage obtained in this way is that there is practically no functional separation between the transmission of the torque via the elastic transmission element and the protection of the latter against external influences, because due to the relative movability against each other, the covering is not following the deformation of the elastomeric body, so its elasticity may also be low. Accordingly, the covering may consist of a less elastic material which, however, has to be resistant to ageing and heat. Said requirements can be satisfied if the covering is made of elastomer sheet, for example a synthetic rubber such as, for example ethylene acrylate rubber. Such materials are adequately resistant to heat as well.

The strength of the covering can be increased further by providing it with a reinforcement. Such reinforcement may be a fabric or a cord vulcanized into the material. This results in high strength even for very thin materials, so that the occurring centrifugal forces are absorbed without noticeable deformation of the covering.

In order to cover the external circumferential surfaces of the transmission element, it suffices if the covering is provided in the form of a ring placeable around the transmission element. Said ring may be nedlessly pre-fabricated from elastic material, so that it can be mounted by being pulled over the transmission element over and beyond the connecting flange, or if it is provided in the form of a section of tape which, on an installed coupling, can be joined to form a ring by gluing or some other type of locking.

So that the friction between the transmission element and the covering is reduced in the presence of relative movements, it is advantageous that a friction-reducing agent is present between said components, for example lubricants in the form of pastes or gels.

The heat transfer from the transmission clement to the covering can be enhanced by inserting between the transmission element and the covering a heat-conducting medium, for example a thermally conductive paste.

Preferably recommended is the application of substances acting heat conductive and friction-reducing at the same time.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

DETAILED DESCRIPTION OF THE PREFERRED EMBODIMENT

Figure 1:
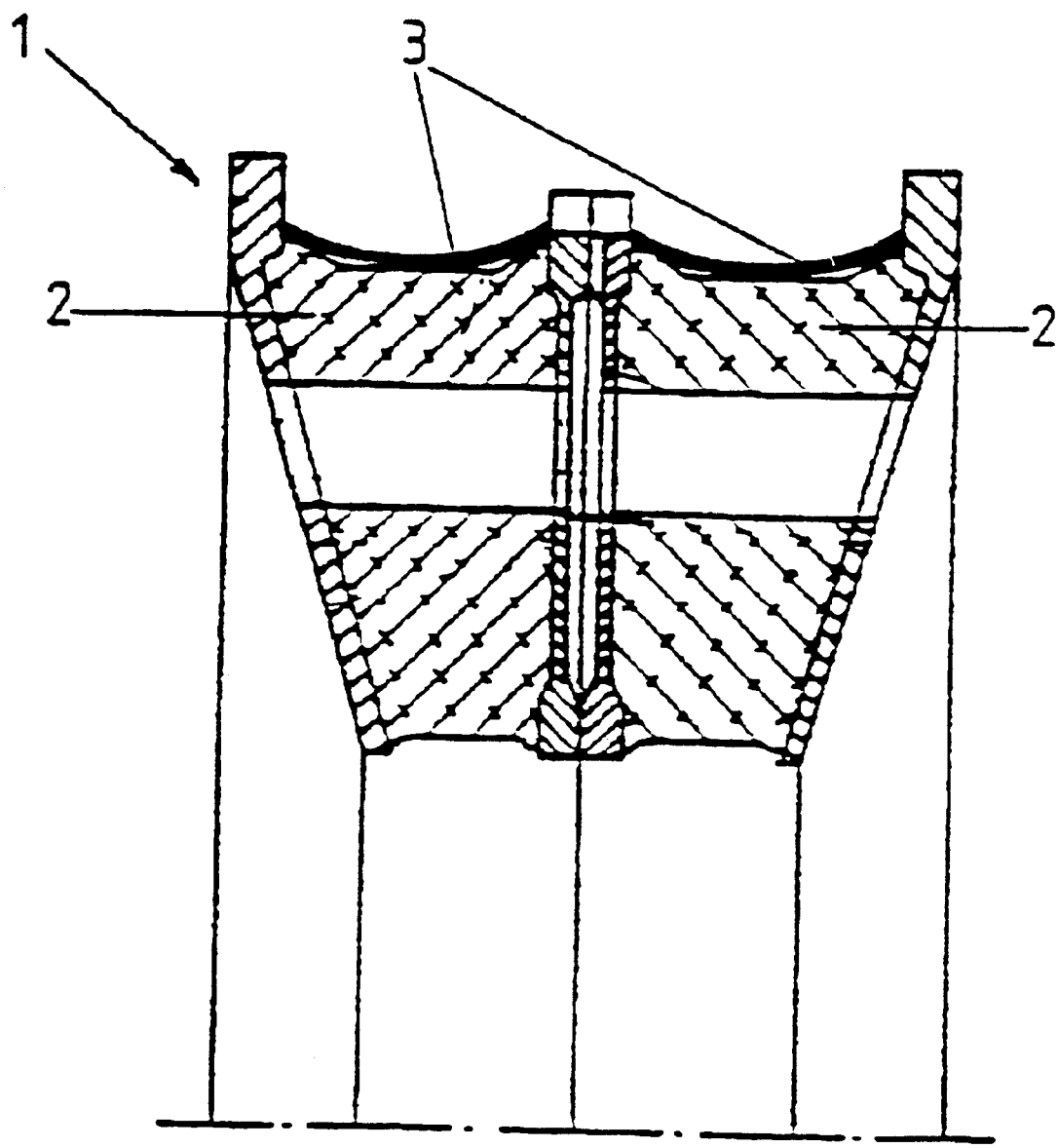
FIG. 1 shows a sectional view of a coupling equipped according to the invention.

An exemplified embodiment of a coupling equipped as defined by the invention is sectionally shown in FIG. 1, where the coupling as a whole is denoted by reference numeral 1. The coupling has two elastic transmission elements 2 designed in the form of torsional elements, which are arranged axially one after the other and each vulcanized to flanges. An annular covering 3 is arranged in each case around the outer surface, i.e. the outer jacket surface of the transmission elements 2, which consist of DIENE rubber. Said covering consists of anti-ageing, thermally stable elastomer, for example ethylene acrylate rubber, and covers the external surface of transmission element 2 outwardly in an airtight way.

Intermediate spaces remaining between the transmission elements 2 and the covering 3, if any, are filled with a thermally conductive lubricant.

The external surface of transmission elements 2 is lastingly protected against oxygen-caused ageing by the covering 1 as defined by the invention even at elevated external temperatures.

What is claimed is:

1. A shaft coupling having at least one elastomer transmission element that is at least partially coated on its surface with an aging-resistant, air-impermeable coating comprising of a covering made of elastomer foil, and a friction-reducing agent disposed between the covering and the surface of the transmission element.

2. The shaft coupling according to claim 1, wherein the covering is disposed only on an outer, exposed circumferential surface of said transmission element.

3. The shaft coupling according to claim 1, wherein the covering is provided with a reinforcement.

4. The shaft coupling according to claim 1, wherein the covering is a ring adapted to be placed around exposed circumferential surfaces of the transmission element.

5. A shaft coupling having at least one elastomer transmission element that is at least partially coated on its surface with an aging-resistant, air-impermeable coating comprising of a covering made of elastomer foil, and a heat conducting agent disposed between the covering and the surface of the transmission element.

* * * * *